2,713,053

2,2'-THIOBIS(5-ACYL-4-ALKYLTHIAZOLES)

John J. D'Amico, Charleston, W. Va., assignor to Monsanto Chemical Company, St. Louis, Mo., a corporation of Delaware No Drawing. Original application June 21, 1952, Serial No. 294,930. Divided and this application September 2, 1954, Serial No. 453,941

4 Claims. (Cl. 260—302)

The present invention relates to a new class of compounds, namely the 2,2'-thiobis(5-acyl-4-alkylthiazoles). The new compounds may be represented by the general formula

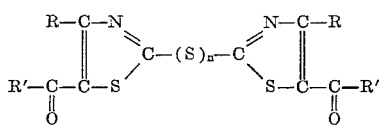

where R and R' represent hydrocarbon groups.

The 5-acyl-2-mercaptothiazoles may be prepared by condensing a 3-chloro-2,4-dione with ammonium dithiocarbamate. For example 3-chloro-2,4-pentanedione was prepared as follows: To 845 grams (8.5 moles) of 2,4-pentanedione in a suitable container provided with a mechanical stirrer, condenser, dropping funnel, thermometer and ice bath, 1140 grams (8.5 moles) of sulfuryl chloride was added dropwise at 0–5° C. over a period of 8.5 hours. The mixture was heated at 90–95° C. for 15 minutes to complete the reaction, then cooled at 25° C., extracted with 500 ml. of 10% aqueous sodium bicarbonate, washed with water until the washings were neutral to litmus and finally dried over sodium sulfate. Distillation of the reaction mixture under 28 mm. pressure gave 880 grams of 3-chloro-2,4-pentanedione, a colorless liquid, B. P. 60–63° C.

236 grams of the 3-chloro-2,4-pentanedione was added to a solution of 194 grams (1.76 moles) of ammonium dithiocarbamate in 1300 grams of water. The reaction mixture was stirred vigorously, the exothermic reaction causing the temperature to rise to about 52° C. and within a short time a solid precipitated. The mixture was stirred for about 8 hours and then the solids filtered off, washed with water until the washings were neutral to litmus and finally dried in an oven at 50° C. There was obtained 226 grams or 74.4% of 2-mercapto-4-methyl-5-thiazolyl methyl ketone, a yellow solid, M. P. 210–211° C. when recrystallized from ethyl alcohol. Analysis for nitrogen gave 8.00% and for sulfur 37.30% as compared to calculated values for $C_6H_7NOS_2$ of 8.09% nitrogen and 37.01% sulfur.

Disulfides may be prepared directly from the mercapto thiazoles by oxidation. In spite of the presence of the carbonyl group, oxidation of the 5-acyl mercapto thiazoles with ammonium persulfate, chlorine, hydrogen peroxide, sodium hypochlorite and other oxidizing agents converts the 5-acyl mercapto thiazoles smoothly to disulfides. The reaction may be conveniently carried out in aqueous medium employing either a suspension of the free mercapto thiazole or a solution of an alkali metal salt thereof. Monosulfides may be prepared from the disulfides by reaction with sodium cyanide. The disulfides take up additional sulfur on heating therewith to form higher sulfides. Additionally, higher sulfides may be produced by reacting the 5-acyl mercapto thiazoles with sulfur halides.

The following example illustrates in detail the preparation of a disulfide.

A fine suspension of 69.3 grams (0.40 mole) of 2-mercapto-4-methyl-5-thiazolyl methyl ketone in 400 ml. of water was prepared in a one liter, three-necked flask, equipped with a mechanical stirrer, dropping funnel, and a thermometer. To this agitated slurry there was added dropwise 339 grams (0.44 mole) of a 30% aqueous solution of ammonium persulfate in 30 minutes at 25–30° C. The mixture was stirred for two hours longer, the precipitate filtered off, and dried at 50° C. The product, a tan solid, was obtained in 99.0% yield. After crystallization from ethyl alcohol it melted at 92-93° C. Analysis gave 8.09% nitrogen and 37.22% sulfur as compared to the calculated values for 2,2'-dithiobis(5-acetyl-4-methylthiazole), $C_{12}H_{12}N_2O_2S_4$, of 8.13% nitrogen and 37.23% sulfur. The molecular weight obtained by the freezing point method using benzene as the solvent was 342.0; calculated 344.5.

As an example of the accelerating activity of the new disulfides as compared to the commercial accelerator 2,2'-dithiobis benzothiazole vulcanizable compositions were compounded comprising

| Stock | A | B | C | D |
|---|---|---|---|---|
| Smoked sheets rubber......parts by weight.. | 100 | 100 | 100 | 100 |
| Zinc oxide..........................................do.... | 5 | 5 | 5 | 5 |
| Stearic acid........................................do.... | 1 | 1 | 1 | 1 |
| Sulfur................................................do.... | 3 | 3 | 3 | 3 |
| 2,2'-Dithiobis benzothiazole................do.... | 1 | | | 0.7 |
| 2,2'-Dithiobis(5-acetyl-4-methyl-thiazole) do.... | | 1 | | 0.7 |
| Diphenyl guanidine............................do.... | | | 0.3 | 0.3 |

The unactivated stocks were cured in the usual manner by heating in a press for 45 minutes at 135° C. and those containing the diphenyl guanidine activator were cured by heating for 15 minutes at the same temperature.

Table

| Stock | Modulus of Elasticity in lbs./in.² at Elongation of 500% | Tensile at Break in lbs./in.² | Ultimate Elongation, Percent |
|---|---|---|---|
| A | 540 | 2,903 | 793 |
| B | 765 | 3,260 | 750 |
| C | 1,380 | 4,360 | 700 |
| D | 1,780 | 4,295 | 665 |

It is intended to cover all changes and modifications of the examples of the invention herein chosen for purposes of disclosure which do not constitute departures from the spirit and scope of the invention.

This application is a division of co-pending application Serial No. 294,930, filed June 21, 1952.

What is claimed is:

1. A compound of the structure

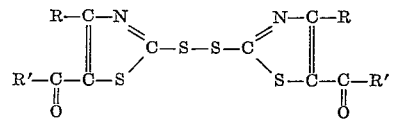

where R and R' represent alkyl groups of less than six carbon atoms.

2. A compound of the structure

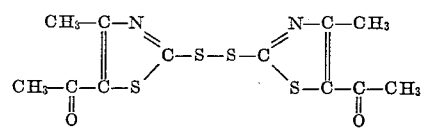

3. The method which comprises oxidizing a mercaptan of the structure
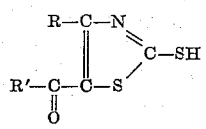
where R and R' represent alkyl groups of less than six carbon atoms and recovering the disulfide.
4. The method which comprises oxidizing a mercaptan of the structure
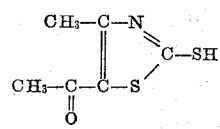
and recovering the disulfide.
No references cited.